United States Patent
Gondre et al.

(10) Patent No.: US 11,753,943 B2
(45) Date of Patent: Sep. 12, 2023

(54) TURBOMACHINE BLADE HAVING A SWEEP LAW WITH HIGH FLUTTER MARGIN

(71) Applicant: SAFRAN AIRCRAFT ENGINES, Paris (FR)

(72) Inventors: Guillaume Pascal Jean-Charles Gondre, Moissy-Cramayel (FR); Nicolas Pierre Alain Edme De Cacqueray-Valmenier, Moissy-Cramayel (FR); Mickaël Cavarec, Moissy-Cramayel (FR); Sadim Dieudonne, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 134 days.

(21) Appl. No.: 17/312,212

(22) PCT Filed: Dec. 10, 2019

(86) PCT No.: PCT/FR2019/053004
§ 371 (c)(1),
(2) Date: Jun. 9, 2021

(87) PCT Pub. No.: WO2020/120897
PCT Pub. Date: Jun. 18, 2020

(65) Prior Publication Data
US 2022/0018259 A1 Jan. 20, 2022

(30) Foreign Application Priority Data
Dec. 11, 2018 (FR) ...................................... 1872700

(51) Int. Cl.
*F01D 5/16* (2006.01)

(52) U.S. Cl.
CPC .......... *F01D 5/16* (2013.01); *F05D 2240/301* (2013.01); *F05D 2260/961* (2013.01)

(58) Field of Classification Search
CPC . F01D 5/16; F01D 5/141; F01D 5/148; F01D 5/20; F01D 5/147; F05D 2240/301; F05D 2260/961
(Continued)

(56) References Cited

U.S. PATENT DOCUMENTS 4,459,083 A * 7/1984 Bingham ................ B64C 11/18
416/223 R
5,297,931 A * 3/1994 Yapp ..................... F04D 29/386
416/223 R
(Continued)

FOREIGN PATENT DOCUMENTS

CN 1757883 A 4/2006
WO 2016124861 A1 8/2016

OTHER PUBLICATIONS

French Search report dated Sep. 24, 2019 from application FR 1872700.
(Continued)

*Primary Examiner* — Hung Q Nguyen
*Assistant Examiner* — Anthony Donald Taylor, Jr.
(74) *Attorney, Agent, or Firm* — Sughrue Mion, PLLC (57) ABSTRACT

A turbomachine rotor blade includes plural blade sections stacked along an axis between a blade root and a blade head defining between the blade root and the blade head the height of the blade, each blade section including a chord and a maximum sweep defined by the maximum length of a segment perpendicular to the chord line and connecting a point of the chord line and a point of a camber line formed of all points located equidistant from the extrados and the intrados in the section, and verifying that the ratio between
(Continued)

the maximum sweep and the chord at mid-height of the blade and the same blade head ratio is between 25% and 40% of the ratio between a maximum sweep and a blade root chord.

10 Claims, 6 Drawing Sheets

(58) Field of Classification Search
USPC .......................................................... 416/190
See application file for complete search history.

(56) References Cited

U.S. PATENT DOCUMENTS

| | | | | |
|---|---|---|---|---|
| 6,595,744 B2* | 7/2003 | Van Houten | .......... | F04D 29/582 |
| | | | | 415/173.1 |
| 7,708,530 B2* | 5/2010 | Wobben | ................ | F03D 1/0641 |
| | | | | 416/243 |
| 10,876,409 B2* | 12/2020 | Nolcheff | ................. | B23P 15/04 |
| 2002/0064458 A1* | 5/2002 | Montgomery | ........ | F04D 29/666 |
| | | | | 415/208.3 |
| 2005/0233654 A1* | 10/2005 | Mueller | ................. | B63H 3/008 |
| | | | | 440/49 |
| 2010/0119366 A1* | 5/2010 | Bushnell | ............... | F04D 29/544 |
| | | | | 415/208.2 |
| 2011/0135482 A1* | 6/2011 | Nash | ....................... | F01D 5/141 |
| | | | | 416/223 A |
| 2012/0063913 A1* | 3/2012 | Fugslang | .............. | F03D 1/0641 |
| | | | | 29/889.7 |
| 2012/0070299 A1* | 3/2012 | Fuglsang | .............. | F03D 1/0675 |
| | | | | 416/223 R |
| 2017/0145827 A1* | 5/2017 | Lewis | ....................... | F01D 5/20 |
| 2017/0152020 A1* | 6/2017 | Wood | ...................... | F01D 5/141 |
| 2017/0175776 A1* | 6/2017 | Theratil | ................ | F04D 29/327 |
| 2017/0184053 A1* | 6/2017 | Harvey | .................... | F02K 1/82 |
| 2018/0073377 A1* | 3/2018 | Hall | .......................... | F02K 3/06 |
| 2018/0100399 A1* | 4/2018 | Peeren | ..................... | F01D 5/16 |
| 2018/0135593 A1* | 5/2018 | Shah | ..................... | F03D 1/0633 |
| 2018/0252113 A1* | 9/2018 | Northall | .................. | F01D 5/142 |
| 2018/0274368 A1* | 9/2018 | Mongillo | ................ | F01D 5/141 |
| 2019/0107046 A1* | 4/2019 | Bowden | ................ | F01D 25/162 |
| 2019/0107123 A1* | 4/2019 | Veitch | ................... | F04D 29/666 |

OTHER PUBLICATIONS

International Search Report dated Mar. 31, 2020, in International Application No. PCT/FR2019/053004.

* cited by examiner

TURBOMACHINE BLADE HAVING A SWEEP LAW WITH HIGH FLUTTER MARGIN

CROSS REFERENCE TO RELATED APPLICATIONS

This application is a National Stage of International Application No. PCT/FR2019/053004, filed Dec. 10, 2019, claiming priority to French Patent Application No. 1872700, filed Dec. 11, 2018, the entire contents of each of which being herein incorporated by reference in their entireties.

GENERAL TECHNICAL FIELD AND PRIOR ART

The invention relates to the field of turbomachine blades and more particularly to the field of turbomachine rotor blades.

The invention is intended in particular to be used in fans within a turbojet or a turbomachine.

A turbomachine comprises at least one blading, such as a fan for example, which includes a plurality of blades arranged radially around a central axis, for example around a disk.

A blading of this type forms either a rotor, when it is mobile blading or a bladed disk, or a stator.

The blades can be considered as excrescences with respect to a continuous ring. Two adjacent blades and the ring define an air flow corridor.

The proximal end of each blade with respect to the central axis is usually denominated the blade root. In particular, the blade root is considered here to be the portion of the blade located over the ring.

The distal end is usually denominated the blade tip. The distance between the root and the tip of the blade is known as the blade height.

Between the root and the tip of the blade, the blade can be represented theoretically by a stack of sections or aerodynamic profiles perpendicular to a radial axis Z.

The blade is a complex part to produce because it is involved simultaneously in aerodynamic, mechanical and acoustic aspects of the blading and of the turbomachine.

The design of the blade and of the blading necessitates working simultaneously on aerodynamic performance, mechanical resistance and the reduction of masses, noise and cost.

The design must guarantee a minimum lifetime of the blade and of the disk to which the blades are attached.

The design must guarantee a minimum vibration resistance of the blading, i.e. sufficient resistance to vibrations, or an acceptable level of vibrations for ensuring mechanical resistance.

The blading must have a resistance to the ingestion of foreign bodies and resistance to blade loss, i.e. resistance of the blading to situations where a blade is partially or entirely detached from the disk.

The flutter phenomenon must be taken into account during the design of the blade and of the blading.

Flutter is aeromechanical coupling due to the relative movement of the air with respect to the structure of the blades and of the blading. Flutter is a self-maintaining phenomenon, the modification of the solid structure modifying the flow of the fluid and the modification of the flow of the fluid generating forces on the solid structure. Flutter can be amplified rapidly and lead to the rupture of a blade of the fan, or even damage to the engine.

Flutter is strongly linked to the design of the structure, so that it is difficult to eliminate or even to limit a flutter phenomenon once it has been detected in the operation of a fan.

There then remains the possibility of prohibiting certain operating zones to limit risks linked to flutter, but this necessarily reduces the flight conditions in which the fan can operate.

Document US 2018/0100399 A1 presents a method for profiling a turbine rotor blade while taking into account the phenomenon of flutter.

There exists therefore a need for a blade and a blading for which the operating zone where flutter appears is as distant as possible from the zone of nominal operation, i.e. a blade and a blading which has the largest possible flutter margin.

GENERAL PRESENTATION OF THE INVENTION

A general goal of the invention is to palliate the disadvantages of the blades and of the fans of the prior art.

In particular, one goal of the invention is to propose a solution for increasing the flutter margin.

Still another goal is to propose a solution for increasing the flutter margin without increasing the mass of the blade.

This goal is achieved within the scope of the present invention by means of a turbomachine rotor blade comprising a leading edge, a trailing edge, a pressure side and a suction side, in which:
- the ratio between a maximum camber and a chord at the mid-height of the blade is comprised between 25% and 40% of the ratio between a maximum camber and a chord at the blade root,
- the ratio between a maximum camber and a chord at the blade tip is comprised between 25% and 40% of the ratio between a maximum camber and a chord at the blade root.

A device of this type is advantageously completed by the following different features, taken alone or in combination:
- the ratio between a maximum camber and a chord at the mid-height of the blade is comprised between 30% and 35%, and preferably amounts to the order of one-third of the ratio between a maximum camber and a chord at the blade root,
- said ratio between a maximum camber and a chord at the blade tip is comprised between 30% and 35%, and preferably amounts to the order of one-third of the ratio between a maximum camber and a chord at the blade root,
- the ratio between a maximum camber and a chord at the blade root is comprised between 10% and 20%, and preferably between 14% and 17%,
- the ration between a maximum camber and a chord at the mid-height of the blade is comprised between 4% and 7%, preferably between 4.7% and 5.7%,
- the variation according to height of the ratio between the maximum camber and the chord of each section of the blade is comprised between:
  - a first function defined
    - by a first line segment defined by a ratio between a maximum camber and a chord at the blade root equal to 14% and a ratio between a maximum camber and a chord at the mid-height of the blade equal to 4.7%, and
    - by a second line segment defined relative to a maximum camber and a chord at the mid-height of the blade equal to 4.7% and a ratio between a maximum camber and a chord at the blade tip equal to 4.7%, and a second function defined by:

by a third line segment defined by a ratio between a maximum camber and a chord at the blade root equal to 17% and a ratio between a maximum camber and a chord at the mid-height of the blade equal to 5.7%, and by a fourth line segment defined by a ratio between a maximum camber and a chord at the mid-height of the blade equal to 5.7% and a ratio between a maximum camber and a chord at the blade tip equal to 5.7%.

the variation according to height of the ratio between the maximum camber and the chord is a function defined by two line segments between the root and the mid-height of the blade, on the one hand, and between the mid-height and the tip of the blade, on the other hand, the ratio between a maximum camber and a chord of a section of the blade is reduced as the height of the section increases from the blade root to the blade mid-height, then retains a quasi-constant value of the ratio between a maximum camber and a chord between the mid-height of the blade and the blade tip, The invention also relates to a turbomachine fan including a plurality of rotor blades as described above.

The invention also relates to a turbomachine which comprises a fan of this type.

PRESENTATION OF THE FIGURES

Other features and advantages of the invention will also be revealed by the description that follows, which is purely illustrative and not limiting, and must be read with reference to the appended drawings, in which.

DESCRIPTION OF ONE OR MORE MODES OF IMPLEMENTATION AND EMBODIMENTS

Turbomachine—General Presentation

Figure 1:
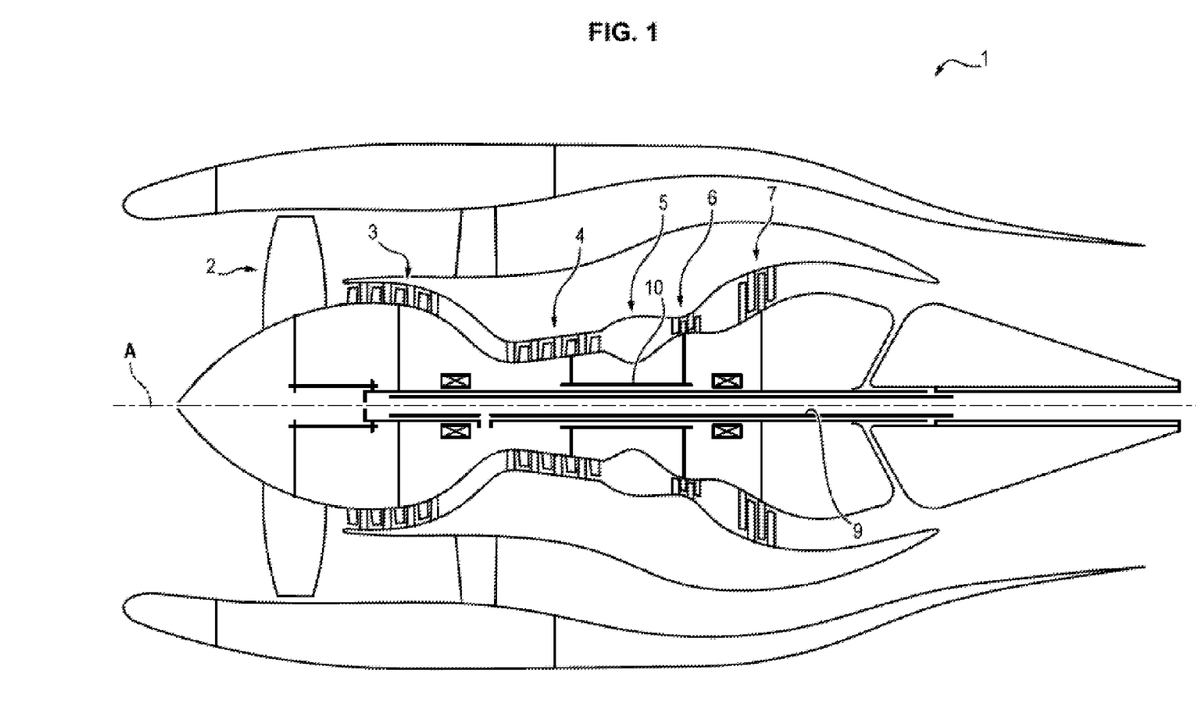
FIG. 1 is a schematic longitudinal section of a turbomachine.

With reference to FIG. 1, a turbomachine is shown schematically, more specifically an axial-flow double flow turbojet 1. The turbojet 1 illustrated includes a fan 2, a low-pressure compressor 3, a high-pressure compressor 4, a combustion chamber 5, a high-pressure turbine 6, and a low-pressure turbine 7.

The fan 2 and the low-pressure compressor 3 are connected to the low-pressure turbine 7 by a first transmission shaft 9, while the high-pressure compressor 4 and the high-pressure turbine 6 are connected by a second transmission shaft 10.

During operation, a flow of air compressed by the low- and high-pressure compressors 3 and 4 feeds combustion in the combustion chamber 5, the expansion of the combustion gases of which drives the high- and low-pressure turbines 6, 7. By means of the shafts 9 and 10, the turbines 6, 7 thus drive the fan 2 and the compressors 3, 4. The air propelled by the fan 2 and the combustion gases leaving the turbojet 1 through a propulsive nozzle (not illustrated) downstream of the turbines 6, 7 exert a reaction thrust on the turbojet 1 and, through it, on a vehicle or machine such as an airplane (not illustrated).

Each compressor 3, 4 and each turbine 6, 7 of the turbojet 1 includes several stages, each stage being formed by a fixed blading or stator, and a rotating blading or rotor.

Figure 2:
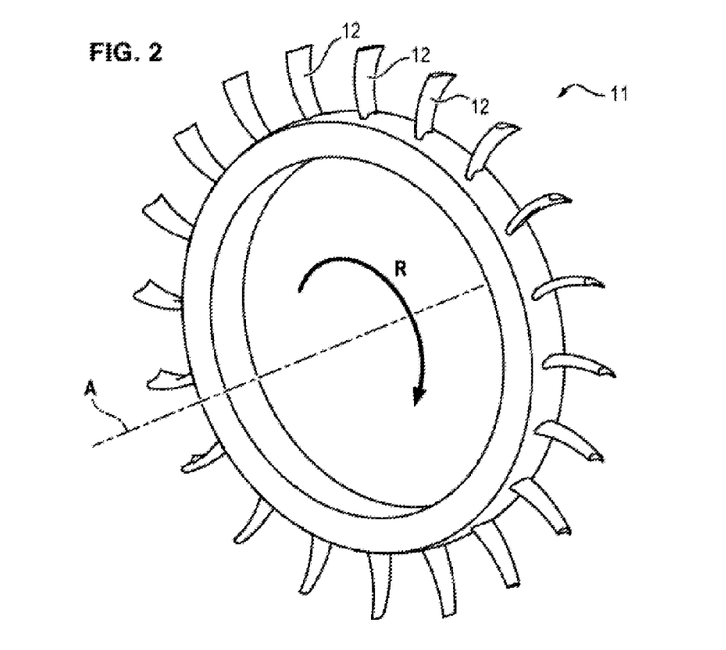
FIG. 2 is a perspective schematic view of a turbomachine fan rotor.

With reference to FIG. 2, a turbomachine fan rotor 11 is illustrated schematically. This rotor 11, includes a plurality of blades 12 arranged radially around the axis of rotation A of the rotor 11, which is substantially parallel to the general flow direction of the working fluid through the turbojet 1.

The blades 12 can consist of parts distinct from the rest of the rotor and be applied to it by attachment means generally known in the prior art, such as pinned fasteners or Christmas tree attachments.

Figure 3:
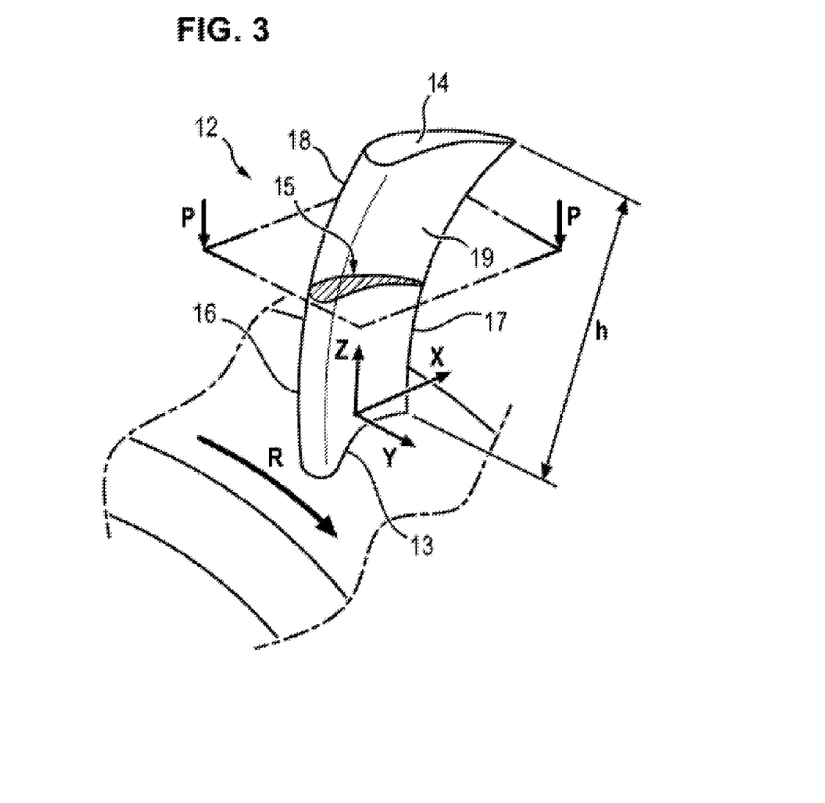
FIG. 3 is a perspective schematic view of a detail of the rotor of FIG. 2.

With reference to FIG. 3, a schematic perspective view of one detail of the rotor of FIG. 2 is offered. Each blade 12 has a spatial reference system with three orthogonal axes X, Y and Z.

The X axis is parallel to the axis of rotation A of the rotor 11, the axis Y is tangent to the direction of rotation R of the blade 12 around the axis of rotation A, and the axis Z is a radial axis in a direction transverse to the axis of rotation A.

Each blade 12 includes a blade root 13 and a blade tip 14 separated by a blade height h in the direction of the radial axis Z.

Between the blade root 13 and the blade tip 14, the blade 12 can be represented theoretically by a stack of sections or aerodynamic profiles 15 in planes perpendicular to the radial axis Z.

Figure 4:
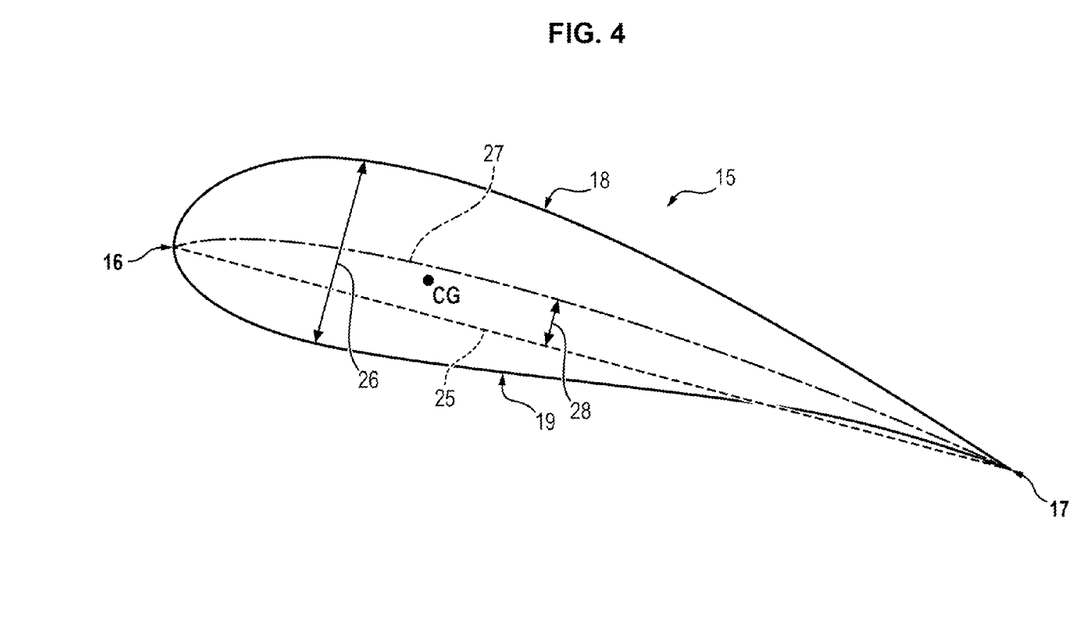
FIG. 4 shows schematically a section of a blade.

The turbomachine rotor blade can be described as including a plurality of blade sections stacked along an axis Z between the blade root and the blade tip, defining between them the height of the blade h. A plane P of this type is shown in FIGS. 3 and 4.

The blade 12 includes a leading edge 16 in the upstream direction, a trailing edge 17 in the downstream direction, a suction side 18 and a pressure side 19.

Each blade section can be described as including a leading edge and a trailing edge.

In a compressor or fan rotor, the direction of rotation R in normal operation is such that each blade 12 moves in the direction of its pressure side 19.

A blade section 15 is shown schematically in FIG. 4 with a chord line 25 and a camber line 27.

The chord line 25 is a segment, i.e. a line segment, connecting the leading edge 16 and the trailing edge 17 in this section 15.

In the present text, the term "chord" alone is used to designate the length of the segment corresponding to the chord line, i.e. the greatest distance between these two points.

The camber line 27 is a curve equal to the average of the suction side curve 18 and the pressure side curve 19 in said section 15. More precisely, the camber line is formed of all the points situated at equal distance from the suction side 18 and the pressure side 19. The distance of a particular point of the suction side (or of the pressure side) is defined here as the minimum distance between the particular point and a point of the suction side (or of the pressure side).

Also shown by double arrows in this FIG. 4 are:
the maximum thickness 26 of the section (maximum distance between the section side 18 and the pressure side 19) in a direction perpendicular to the chord line,
the maximum distance or maximum camber 28 between the chord 25 and the camber line 27; the maximum camber corresponds to the maximum length of a segment perpendicular to the chord line and connecting a point of the chord line and a point of the camber line;
the center of gravity CG of the blade section, which is the barycenter of the masses of the blade section. The position of the center of gravity is defined in the plane of the section with respect to the axis Z, i.e. by coordinates along the axes X and Y in said section.

Maximum Camber Law

The maximum cambers of the blades vary depending on the height of the section that corresponds to them within the height of the blade.

It has been noted by the inventors that the maximum camber laws allow much better flutter margins This is the case particularly when the following relations are satisfied:
the ratio between the maximum camber and the mid-height blade chord is comprised between 25% and 40% of the ratio between a maximum camber and a chord at the blade root,
the ratio between a maximum camber and a chord at the blade tip is comprised between 25% and 40% of the ratio between a maximum camber and a chord at the blade root.

Better margins are also obtained if the ratio between a maximum camber and a chord at the mid-height of the blade is comprised between 30% and 35%, and preferably amounts to the order of one-third of the ratio between a maximum camber and a chord at the blade root. On the order of one-third signified here being equal to one-third within plus or minus one percent.

Likewise, the ratio between a maximum camber and a chord at the blade tip can be comprised between 30% and 35%, and preferably amount to the order of one-third of the ratio between a maximum camber and a chord at the blade root.

More precisely, the maximum camber law can verify other features also contributing to increasing the flutter margins, such as for example:
The ratio between a maximum camber and a chord at the blade root is comprised between 10% and 20%, and preferably between 14% and 17%.
The ratio between a maximum camber and a chord at the mid-height of the blade is comprised between 4% and 7%, preferably between 4.7% and 5.7%
The ratio between a maximum camber and a chord at the blade tip is comprised between 4% and 7%, preferably between 4.7% and 5.7%

These features allow in particular obtaining an evolution of the ratio between a maximum camber and a chord such that there is a strong decrease in the ratio between a maximum camber and a chord from the blade root to the mid-height of the blade, then a quasi-constant value of the ratio between a maximum camber and a chord between the mid-height of the blade and the blade tip.

As a variant, the blade can also verify the maximum camber law proposed in the form of bounds:
The ratio between the maximum camber and a chord at 0% of height is comprised between the values r and s.
The ratio between a maximum camber and a chord at 50% height is comprised between the values t and u.
The ratio between a maximum camber and a chord at 100% height is comprised between the values v and w.

Figure 5:
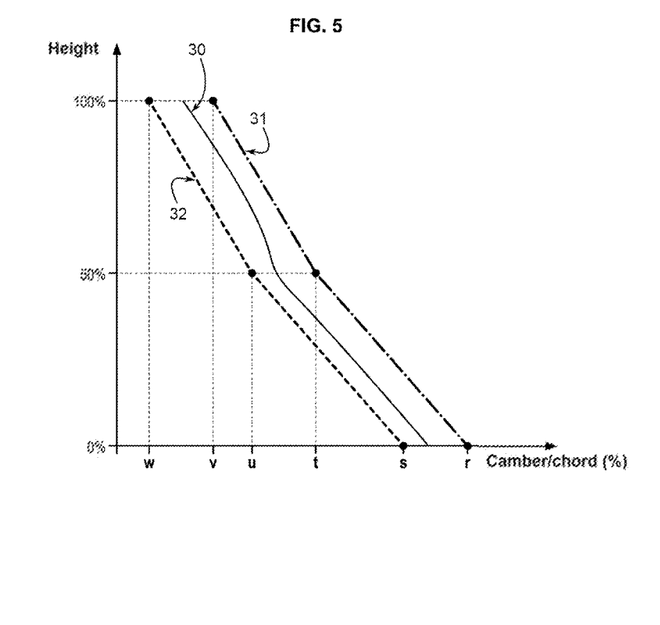
FIG. 5 is a diagram illustrating the evolution, between the root and the tip of the blade, of the ratio of the maximum camber to the blade chord according to the invention.

A maximum camber law in this sense is illustrated in the graph of FIG. 5, in which the value of the ratio between a maximum camber and a chord is shown in the abscissa, while the height of the blade section is shown as the ordinate, 0% corresponding to a reference at the blade root, 100% corresponding to the blade tip. The value of 50% height is located in the mid-height zone of the blade. In the present text, the mid-height zone of the blade corresponds to the interval of height between 45% height and 55% height of the blade.

In FIG. 5, the maximum camber law of the blade is shown by the curve 30 in a continuous line on the graph. The curve 30 is a graphic representation of the variation according to height of the ratio between the maximum camber and the chord as a function of height.

In FIG. 5, the six limits r, s, t, u, v and w of the ratio between the maximum camber and a chord have been placed on the axis of the abscissas and, in correspondence with these ratios, the different percentages of the associated height are placed on the ordinate axis.
r can be comprised between 17% et 20% and preferably between 17% and 18%;
s can be comprised between 10% et 14% and preferably between 13% and 14%;
t can be comprised between 5.7% et 7% and preferably between 5.7% and 6%;
u can be comprised between 4% et 4.7% and preferably between 4.5% and 4.7%;
v can be comprised between 5.7% et 7% and preferably between 5.7% and 6%;
w can be comprised between 4% et 4.7% and preferably between 4.5% and 4.7%.

The curve 30 in a continuous line is comprised between two limit curves 31 and 32, which are two piecewise affine curves (curved formed by line portions or segments).

The curve 31 (in phantom lines) is defined in this case by two rays:
one extending between a point corresponding to a value of the chord equal to r for a height of 0% and a point with a chord value equal to t for a height of 50%,
the other extending between said point with a chord value equal to t for a height of 50% and a point corresponding to a chord value equal to v for a height of 100%.

The curve 32 (in simple dotted lines) is defined
by a ray extending between a point with a chord value equal to s for a height of 0% and a point corresponding to a chord value equal to u for a height of 50%,
by a ray which extends from said point corresponding to a chord value equal to u for a height of 50% and a point with a chord value equal to w for a height of 100%.

The space between the two curves 31, 32 defines a corridor in which the graph corresponding to the maximum camber law is located.

The maximum camber laws proposed correspond to a blade, the shape of which approaches the shape of a flat plate in its upper portion. A feature of this type allows increasing the flutter margin.

According to a more general variant, the maximum camber law can verify other features also contributing to increasing flutter margins. For example, a maximum camber law of the blade depending on its height can correspond to the variation according to height of the ratio between the maximum camber and the chord of each section of the blade and be comprised between:

a first function defined
   by a first line segment defined by a radio between a maximum camber and a chord at the blade root equal to 14% and a ratio between a maximum camber and a chord at the mid-height of the blade equal to 4.7%, and
   by a second line segment defined by a ratio between a maximum camber and a chord at the mid-height of the blade equal to 4.7% and a ratio between a maximum camber and a chord at the blade tip equal to 4.7%, and
a second function defined by
   by a third line segment defined by a ratio between a maximum camber and a chord at the blade root equal to 17% and a ratio between a maximum camber and a chord at the mid-height of the blade equal to 5.7%, and
   by a fourth line segment defined by a ratio between a maximum camber and a chord at the mid-height of the blade equal to 5.7% and a ratio between a maximum camber and a chord at the blade tip equal to 5.7%.

The curve 30 which is a graphic representation of the variation according to height of the ratio between the maximum camber and the chord is comprised between the two graphic representations of the functions as they have just been defined.

More precisely, the graph corresponding to the maximum camber law can vary along two line segments, between the roots and the mid-height of the blade on the one hand, and between the mid-height and the blade tip on the other hand.

Equivalently, the variation according to height of the ratio between the maximum camber and the chord can be a function defined by two line segments between the root and the mid-height of the blade on the one hand, and between the mid-height and the blade tip on the other hand.

The graph can also correspond to a ratio between a maximum camber and a chord of a blade section which decreases when the height of the section increases.

In particular, the graph can correspond to a ratio between a maximum camber and a chord of a blade section which decreases strongly when the height of the section increases from the blade root to the mid-height of the blade, then remains quasi constant between the mid-height of the blade and the blade tip.

Operating Lines of a Turbomachine Fan

Figure 6:
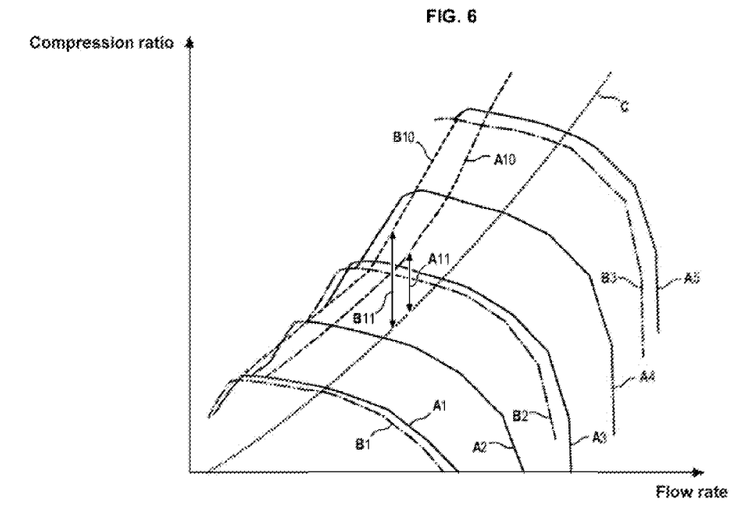
FIG. 6 shows schematically the operating lines of a fan conforming to one embodiment of the invention, and of a fan according to the prior art.

With reference to FIG. 6, the operating lines of a fan represent schematically the compression ratio as a function of flow rate.

The curves A1, A2, A3, A4 and A5 correspond to five engine speeds, i.e. five rotation speeds of the engine, involving blades and a fan of the prior art. At a given speed, flight conditions impose a position on the curve or an operating point of the engine, i.e. a pair of flow rate and compression ratio values. Ideally, the operating point of the engine is located near the curve C, which is the nominal operating curve.

Curve A10 embodies the border of the flutter zone according to the same prior art. The operating points of the engine located on the curves A1, A2, A3, A4 or A5 and to the left of curve A10 correspond to a large flutter phenomenon.

The flutter margin can be defined as a distance A11 between curve C and curve A10.

Curve B10 embodies the border of the flutter zone of the corresponding engine. The flutter margin can be defined as a distance B11 between curve B10 and curve C, the nominal operating curve.

The distance B11 being greater than the distance A11, the flutter margin has been increased relative to the prior one.

The proposed maximum camber laws correspond to a blade, the shape of which approaches the shape of a flat plate in its upper portion.

A flat plate is associated with movements comprising a strong bending component and a small torsion component.

One advantage contributed by the invention is the increase of the flutter margin without degrading the mechanical behavior of the blade or the aerodynamic performance of the blade. In particular, the bending-torsion coupling can be reduced without it being necessary to increase the mass of the blade.

The invention claimed is:

1. A turbomachine rotor blade comprising
a first blade section, a second blade section and a third blade section stacked along an axis Z between a blade root and a blade tip, the blade root and the blade tip defining between them a height of the blade,
the first blade section being located at the blade root and corresponding to 0% of the height of the blade, the second blade section being located at 50% of the height of the blade, and the third blade section being located at the blade tip and corresponding to 100% of the height of the blade,
each of the three blade sections including
   a leading edge,
   a trailing edge
   a pressure side, and
   a suction side,
each of the three blade sections presenting
   a chord defined by a length of a chord line connecting the leading edge and the trailing edge,
   a camber line formed of all points located equal distance from the suction side and the pressure side,
   a maximum camber defined by a maximum length of a segment perpendicular to the chord line and connecting a point of the chord line and a point of the camber line, and
   a ratio between the maximum camber and the chord,
   wherein
      the ratio between the maximum camber and the chord at the second blade section is between 25% and 40% of the ratio between the maximum camber and the chord at the first blade section, and
      the ratio between the maximum camber and the chord at the third blade section is between 25% and 40% of the ratio between the maximum camber and the chord at the first blade section.

2. The turbomachine rotor blade according to claim 1, wherein the ratio between the maximum camber and the chord at the second blade section is between 30% and 35% of the ratio between the maximum camber and the chord at the first blade section.

3. The turbomachine rotor blade according to claim 1, wherein the ratio between the maximum camber and the chord at the third blade section is between 30% and 35% of the ratio between the maximum camber and the chord at the first blade section.

4. The turbomachine rotor blade according to claim 1, wherein the ratio between the maximum camber and the chord at the first blade section is between 10% and 20%.

5. The turbomachine rotor blade according to claim 1, wherein the ratio between the maximum camber and the chord at the second blade section is between 4% and 7%.

6. The turbomachine rotor blade according to claim 1, wherein the ratio between the maximum camber and the chord at the third blade section is between 4% and 7%.

7. The turbomachine rotor blade according to claim 1, wherein:
the ratio between the maximum camber and the chord depends on a height of one of the three blade sections and is between:
a minimum piecewise affine function defined by:
a first line segment defined by a minimum ratio between the maximum camber and the chord at the first blade section equal to 14% and a minimum ratio between the maximum camber and the chord at the second blade section equal to 4.7%, and
a second line segment defined by the minimum ratio between the maximum camber and the chord at the of second blade section and a minimum ratio between the maximum camber and the chord at the third blade section equal to 4.7%; and
a maximum piecewise affine function defined by:
a third line segment defined by a maximum ratio between the maximum camber and the chord at the first blade section equal to 17% and a maximum ratio between the maximum camber and the chord at the second blade section equal to 5.7%, and
a fourth line segment defined by the maximum ratio between the maximum camber and the chord at the second blade section and a maximum ratio between the maximum camber and the chord at the third blade section equal to 5.7%.

8. The turbomachine rotor blade according to claim 1, wherein:
the ratio between the maximum camber and the chord depends on a height of one of the three blade sections and is configured according to a piecewise affine function defined by a first line segment defined for a height between the first blade section and the second blade section and a second line segment defined for a height between the second blade section and the third blade section.

9. A turbomachine fan including a plurality of rotor blades according to claim 1.

10. A turbomachine including the fan according to claim 9.

* * * * *